US006310992B1

(12) United States Patent
Gehrke et al.

(10) Patent No.: US 6,310,992 B1
(45) Date of Patent: Oct. 30, 2001

(54) METHOD AND APPARATUS FOR INTERCONNECTING MULTIPLE MODULAR DEVICES IN A COMMUNICATION SYSTEM

(75) Inventors: James K. Gehrke, Lake in the Hills; Daniel R. Schroeder, Carol Stream, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/219,325

(22) Filed: Dec. 22, 1998

(51) Int. Cl.$^7$ .................................................. H04N 17/00
(52) U.S. Cl. ............................ 385/24; 359/152; 359/189
(58) Field of Search .................................. 385/24, 1, 2, 3, 385/4; 359/109, 152, 180, 189, 195, 188, 154, 163, 173

(56) References Cited

U.S. PATENT DOCUMENTS 6,038,048 * 3/2000 Harris et al. ......................... 359/163

FOREIGN PATENT DOCUMENTS 0 402 295 * 12/1990 (EP) .

* cited by examiner

Primary Examiner—Frank G. Font
Assistant Examiner—Tu T Nguyen
(74) Attorney, Agent, or Firm—Steven A. May; Jeffrey K. Jacobs

(57) ABSTRACT

An apparatus (100), comprising multiple modular electrical devices (102, 104, 504) and an optical signal source (106), all coupled to an optical communication resource (108), and method for the interconnection of the multiple modular electrical devices (102, 104, 504) provides for a first modular electrical device (102) of the multiple modular electrical devices to locate a second modular electrical device (104) of the multiple modular electrical devices and to selectively address a communication among multiple modular electrical devices (102, 504).

17 Claims, 5 Drawing Sheets

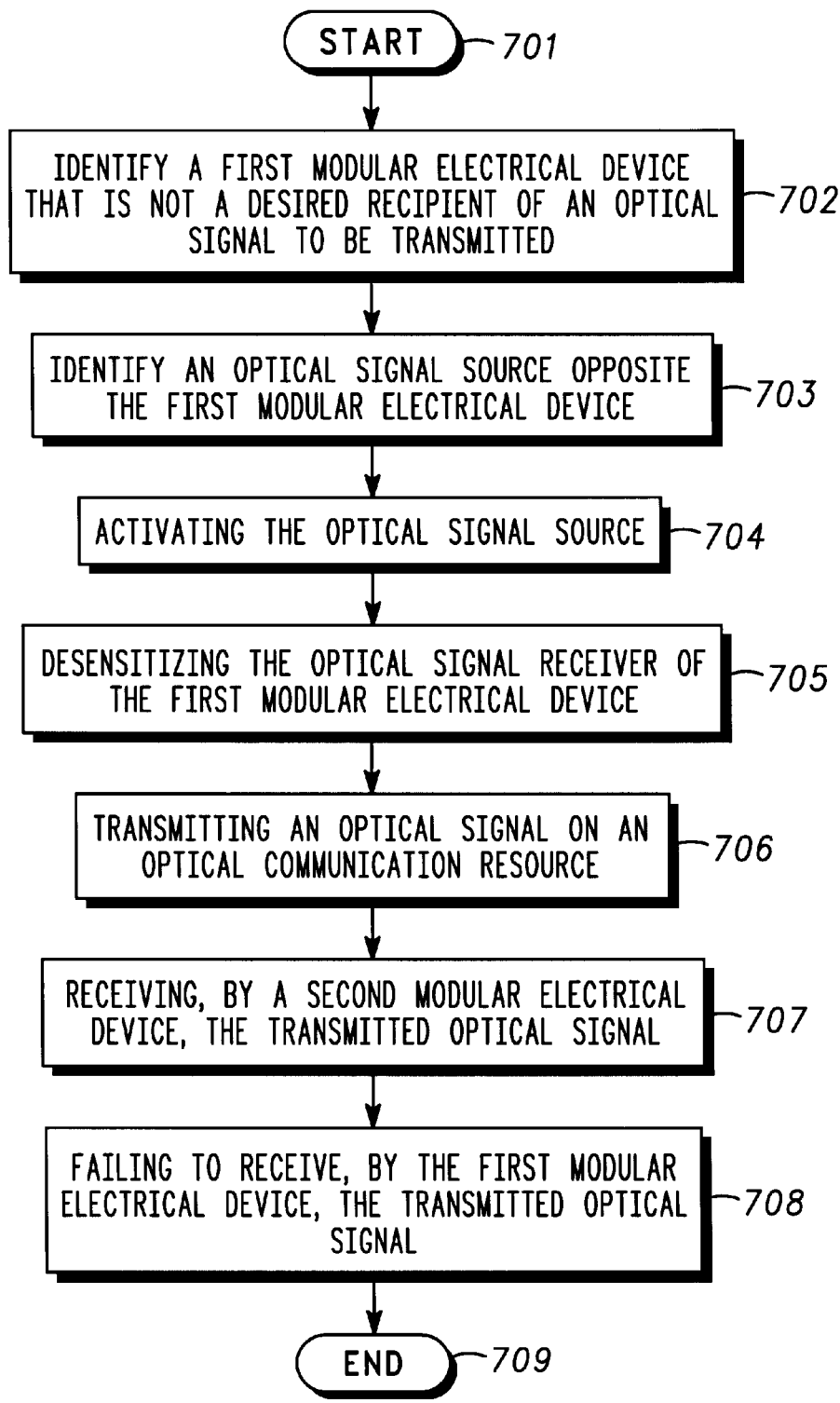

METHOD AND APPARATUS FOR INTERCONNECTING MULTIPLE MODULAR DEVICES IN A COMMUNICATION SYSTEM

FIELD OF THE INVENTION

This invention relates generally to communication systems, and, in particular, to the interconnection of multiple modular electrical devices in a communication system.

BACKGROUND OF THE INVENTION

Wireless communication systems typically utilize fixed position radio frequency base stations and control racks that facilitate communications to, from, and among a group of movable radios such as mobile radios and portable radios. The fixed position base stations may resemble card cages with multiple slots to accommodate multiple vertically inserted or horizontally inserted base station modules, such as a transmitter module, a receiver module, or a controller module, and are typically mounted in racks, which racks are located near one or more antennas. Typically, the base station modules are interconnected via parallel electrical paths provided by wire cables, by coaxial cables, by an interconnecting printed circuit board, or by some combination thereof.

When a new module is added to the base station, the new module must often be manually configured by a technician for proper operation in the base station. Depending upon the type of module, manual configuration can include programming the new module for the desired frequency of operation, querying the new module to confirm that it is correctly configured for proper operation in the slot into which the module has been inserted, and reprogramming a controller module to account for the new module. The technician might also manually enter data concerning the new module into the controller module.

The trend in the modular design of base stations is toward smaller modules and more modules per rack, quick and inexpensive module replacement and system expansion, and an automated set-up and reconfiguration process. However, squeezing more modules into a reduced volume raises the problem of an increased number of parallel electrical paths compressed into a smaller volume and increased opportunities for radio frequency (RF) electromagnetic interference both among the modules in the base station and among the base stations in racks in close proximity to each other.

Therefore, a need exists for a method and an apparatus for interconnecting multiple modular electrical devices, such as base station modules, in a communication system, wherein the method and apparatus can accommodate an increased number of modules in a smaller volume at reduced levels of RF electromagnetic interference and wherein the method and apparatus facilitates automated configuration and inter-module communication orchestrated by a controller module rather than by a technician.

BRIEF DESCRIPTION OF THE DRAWINGS

FIG. 7 is a logic flow diagram of steps executed by multiple communication devices in a communication system to communicate optically in accordance with a preferred embodiment of the present invention.

DESCRIPTION OF A PREFERRED EMBODIMENT

Figure 1:
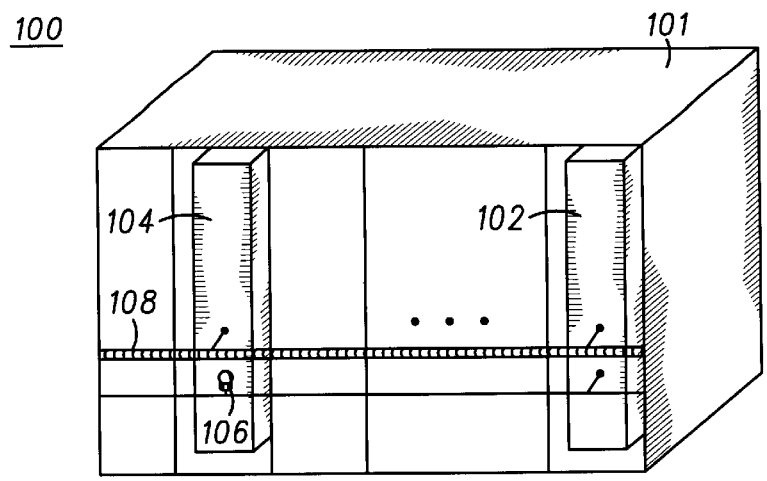
FIG. 1 is a block diagram of a communication system in accordance with a preferred embodiment of the present invention.

To address the need for a method and an apparatus for interconnecting multiple modular electrical devices in a communication system, wherein the method and apparatus can accommodate an increased number of modules in a smaller volume at reduced levels of radio frequency (RF) electromagnetic interference and wherein the method and apparatus facilitates automated configuration and inter-module communication orchestrated by a controller module rather than by a technician, an apparatus, comprising multiple modular electrical devices and an optical signal source, all coupled to an optical communication resource, and method for the interconnection of multiple modular electrical devices provides for a first modular electrical device to locate a second modular electrical device and to selectively address a communication among multiple modular electrical devices.

Generally, the present invention encompasses an apparatus for interconnecting multiple modular electrical devices. The apparatus comprises a first modular electrical device of the multiple modular electrical devices, wherein the first modular electrical device comprises an optical signal transmitter that transmits a first optical signal, a second modular electrical device of the multiple modular electrical devices, wherein the second modular electrical device comprises an optical signal receiver that receives the first optical signal, an optical signal source that transmits a second optical signal, wherein the second optical signal desensitizes the optical signal receiver of the second modular electrical device, and an optical communication resource coupled to the first modular electrical device, the second modular electrical device, and the optical signal source.

Another embodiment of the present invention encompasses a method of determining a location of a modular electrical device, wherein the modular electrical device comprises an optical signal receiver and an optical signal transmitter. The method comprises the steps of transmitting an optical signal via an optical communication resource, optically desensitizing the modular electrical device, and determining a location of the modular electrical device.

Finally, the present invention encompasses a method executed by a communication system comprising multiple modular electrical devices, an optical signal source, and an optical communication resource, for selectively communicating among the multiple modular electrical devices. The method comprises the steps of identifying a first modular electrical device of the multiple modular electrical devices, wherein the first modular electrical device is not a desired recipient of an optical signal to be transmitted, identifying the optical signal source, wherein the optical signal source is positioned opposite the first modular electrical device along the optical communication resource, activating the optical signal source, optically desensitizing the first modular electrical device in response to the activation of the optical signal source, transmitting an optical signal on the optical communication resource, receiving, by a second modular electrical device of the multiple modular electrical devices, the transmitted optical signal, and failing to receive, by the first modular electrical device, the transmitted optical signal.

Turning now to the drawings, wherein like numerals designate like components, FIG. 1 is a block diagram of an apparatus 100 in accordance with a preferred embodiment of the present invention. The apparatus 100 comprises multiple modular electrical devices 102, 104 (two shown), a mechanical structure 101 with respect to which each modular electrical device 102, 104 of the multiple modular electrical devices may be inserted and removed, and serial bus 108 interconnecting the multiple modular electrical devices. In the preferred embodiment, the apparatus 100 constitutes a base station such as is contained in an "iDEN" Enhanced Base Transceiver Site (EBTS) that is commercially available from Motorola, Inc., of Schaumburg, Illinois, modified for the purposes described below. The base station 100 comprises a chassis 101 that resembles a card cage with multiple slots that can accommodate the insertion of multiple base station modules. In alternate embodiments of the present invention, the apparatus 100 might constitute any electrical device comprising multiple modular electrical devices, such as mother boards, daughter boards, other types of circuit boards, or housings comprising circuit boards, a mechanical structure with respect to which the modular electrical devices may be inserted and removed, and a serial bus interconnecting the modular electrical devices. For example, the apparatus 100 might constitute a PBX switch or a communication controller or any other multi-circuit board electrical device of a modular design with a serial bus.

In the preferred embodiment, a first modular electrical device 102 of the multiple modular electrical devices constitutes a controller module and a second modular electrical device 104 of the multiple modular electrical devices constitutes a radio frequency (RF) module (e.g., an RF transmitter module or an RF receiver module), modified for the purposes described below, such as are contained in a base station that is a part of an "iDEN" EBTS; however, either module 102, 104 could be any type of base station module, such as another controller module or an RF module or an interconnect module. The controller module 102 and the RF module 104 are each located in a separate slot in the base station card cage 101. The serial bus 108 is an optical communication resource, wherein the optical communication resource 108 traverses all slots in the card cage 101 and is coupled to the controller module 102 and the RF module 104. The optical communication resource 108 is, preferably, an optical signal conductor, such as a light pipe; however, those of ordinary skill in the art will recognize that any tubular device, such as a fiber optic cable, that conducts optical signals may be utilized without varying from the scope of the present invention. In the preferred embodiment, the apparatus 100 further comprises an optical signal source 106 that is coupled to the controller module 102 and to the optical communication resource 108.

Figure 2:
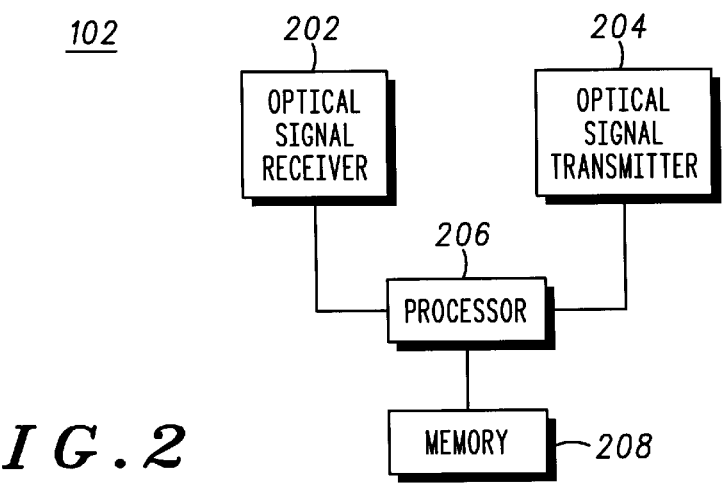
FIG. 2 is a block diagram of a controller in accordance with a preferred embodiment of the present invention.
Figure 3:
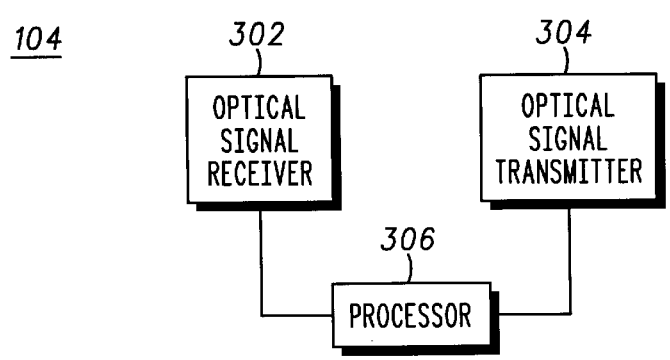
FIG. 3 is a block diagram of a communication device in accordance with a preferred embodiment of the present invention.

FIG. 2 is a block diagram of the controller module 102 in accordance with a preferred embodiment of the present invention. The controller module 102 comprises an optical signal receiver 202, an optical signal transmitter 204, and a memory 208, all coupled to a processor 206. Preferably, the memory 208 comprises a database comprising a location (e.g., an opposite slot in the transceiver card cage 101) of the optical signal source 106. FIG. 3 is a block diagram of the RF module 104 in accordance with a preferred embodiment of the present invention. The RF module 104 comprises an optical signal receiver 302 and an optical signal transmitter 304 coupled to a processor 306. In the preferred embodiment, the optical signal receivers and transmitters are IrDA devices, however, those of ordinary skill in the art will recognize that other optical signal receivers and transmitters may be utilized without varying from the scope of the present invention.

The optical signal receivers 202, 302 and the optical signal transmitters 204, 304 of the controller module 102 and the RF module 104 couple to the optical communication resource 108 when the controller module 102 and the RF module 104 are each plugged into a respective slot in the base station card cage 101. The optical signal receivers 202, 302 receive, and the optical signal transmitters 204, 304 transmit, optical signals via the optical communication resource 108.

Figure 4:
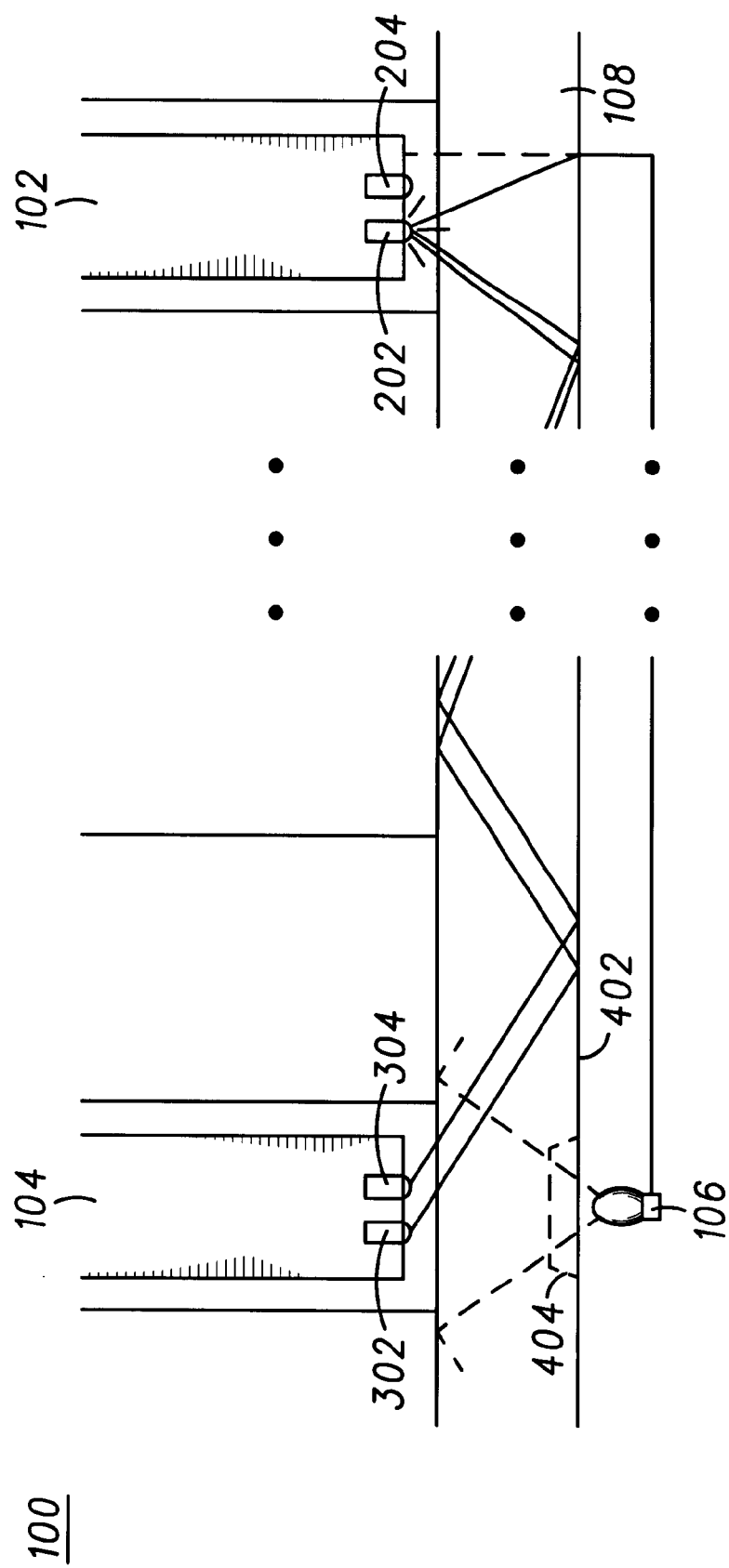
FIG. 4 is an illustration of a horizontal cross-section of a communication system in accordance with a preferred embodiment of the present invention.

FIG. 4 is a horizontal cross-section of the apparatus 100 as shown in FIG. 1. As illustrated in FIG. 4, the optical communication resource 108 traverses all of the slots of the base station card cage 101. The optical signal receivers 202, 302 and the optical signal transmitters 204, 304 of the controller module 102 and the RF module 104 interface with the optical communication resource 108. Positioned along the optical communication resource 108 and opposite an optical signal receiver of at least one base station module (e.g., the optical signal receiver 302 of the RF module 104) is an optical signal source (e.g., optical signal source 106). Alternatively, the optical signal source 106 might be embedded in the optical communication resource 108.

In the preferred embodiment, the optical communication resource 108 comprises an exterior surface 402, wherein surface roughness is sufficient to alter the path of an optical signal emitted by an optical signal transmitter 204, 304 so that the optical signal propagates parallel to a transmission channel provided by the optical communication resource 108 and reflects from the transmission channel to an optical signal receiver 202, 302. Alternatively, at least a portion of the exterior surface 402 may be a reflective surface, or indentations 404 or an optically reflective internal wall may be designed into the optical communication resource 108, that can alter the path of an optical signal propagating in the transmission channel.

In the preferred embodiment, the controller module 102 transmits a first optical signal via the optical communication resource 108. The controller module 102 also conveys a control signal (e.g., a voltage) to the optical signal source 106. The optical signal source 106 (e.g., a light-emitting diode or an incandescent bulb) is activated in response to the control signal and desensitizes the optical signal receiver 302 of the RF module 104, preferably by transmitting a second optical signal that illuminates the optical signal receiver 302. Preferably, the beam of the second optical signal is sufficiently narrow that it only desenses the optical signal receiver 302 of the RF module 104; however, alternatively, all base station modules except a module in the slot opposite the optical signal source 106 may be optically shielded from the optical signal source 106. In the absence of being desensitized, the RF module 104 would transmit a third optical signal in response to receiving the first optical signal. When desensitized, the RF module 104 fails receive the first optical signal and is thereby prevented from transmitting the third optical signal.

In the preferred embodiment, after transmitting the first optical signal and the control signal, the controller module 102 detects, via the optical signal receiver 202 of the controller module 102, for the presence of the third optical signal on the optical communication resource 108. The controller module 102 determines whether the RF module 104 has received or failed to receive the first optical signal based on the detected presence or absence of the third optical signal.

When the controller module 102 determines that the RF module 104 has failed to receive the first optical signal, the controller module 102 determines that the RF module 104 has been desensitized by the activation of the optical signal source 106. The controller module 102 then determines a location (e.g., a slot in the base station chassis 101) of the RF module 104 by reference to the database in the memory 208 of the controller module 102. Preferably, in the database, the location of the optical signal source 106 is referenced to a slot opposite the optical signal source 106. When the controller module 102 determines that the RF module 104 has been desensitized by the activation of the optical signal source 106, the controller module 102 determines that the RF module 104 is located in a slot in the card cage opposite the optical signal source 106. The controller module 102 then determines a location of the RF module 104 (i.e., the slot in which the RF module 104 is located) by reference to the database. Information on the location of the RF module 104, and on the optical signal source 106 opposite the RF module 104, is then stored in the memory 208 of the controller module 102.

When the location of the RF module 104 has been determined, the controller module 102 selectively communicates with the RF module 104 by transmitting a data packet along the optical communication resource 108 and addressing the packet to the RF module 104 by use of an identifier in the header of the packet that is unique to the RF module 104. Alternatively, the controller module 102 may selectively communicate with the RF module 104 by transmitting a signal along the optical communication resource 108 and activating or inactivating the optical signal source 106 opposite the RF module 104 in order to exclude or include the RF module 104 from the communication.

Figure 5:
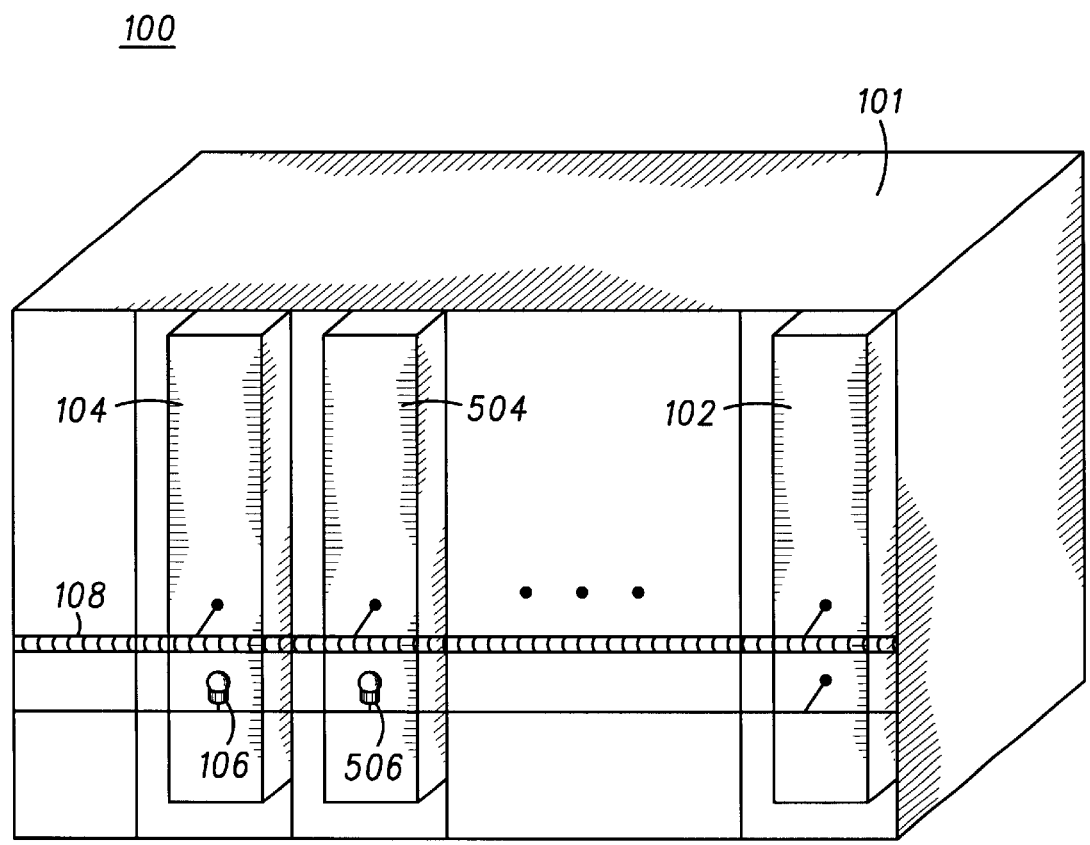
FIG. 5 is a block diagram of a communication system in accordance with an alternate embodiment of the present invention

FIG. 5 is a block diagram of an apparatus 100 in accordance with an alternate embodiment of the present invention. In the alternate embodiment as shown in FIG. 5, the apparatus 100 as shown in FIG. 1 further comprises a third modular electrical device 504, preferably a second RF module, of the multiple modular electrical devices, and a second optical signal source 506, both coupled to the optical communication resource 108, wherein the RF module 104 and the optical signal source 106 described in FIG. 1 respectively constitute a first RF module and a first optical signal source. The second RF module 504 comprises an optical signal receiver and preferably is located in a slot in the base station card cage 101. In the alternate embodiment as shown in FIG. 5, the first and second optical signal sources 106, 506 are respectively positioned along the optical communication resource 108 opposite the first and second RF modules 104, 504. In the event that the controller module 102 configures the second RF module 504, the controller module 102 will first desensitize the first RF module 104 by activating the first optical signal source 106. The controller module 102 can then configure the second RF module 504 by transmitting information to the second RF module 504 via the optical communication resource 108 without affecting the first RF module 104.

As briefly discussed above, the present invention provides an optical communication system for interconnecting modular electrical devices, such as base station modules. Optical signals do not radiate RF electromagnetic interference. The use of optical signals propagating along an optical communication resource eliminates the problems of RF electromagnetic interference coupling onto other, parallel communication resources or radiating to other base stations or other external electrical devices in the same rack or at the same base site. By using optical signals, the present invention provides an apparatus that can accommodate an increased number of modules in a smaller volume, since the concern of increased RF electromagnetic interference due to the condensing of more electrical paths into a smaller volume is eliminated.

The present invention also provides for modules in the communication system to selectively communicate among each other via optical signals and an optical communication resource by providing a means to inactivate the optical signal receiver of each module. By activating an optical signal source opposite an optical signal receiver of a first base station module, such as an RF module, and thereby desensitizing the optical signal receiver to other optical signals, a second base station module, such as a controller module, can determine a location (e.g., a chassis slot) of the RF module and then selectively query, and distribute information to, the RF module. Thus, the need for a technician to program the controller module with the location of, and configuration information concerning, the RF module and for the technician to configure the RF module is eliminated and can instead be performed by the controller module itself.

Figure 6:
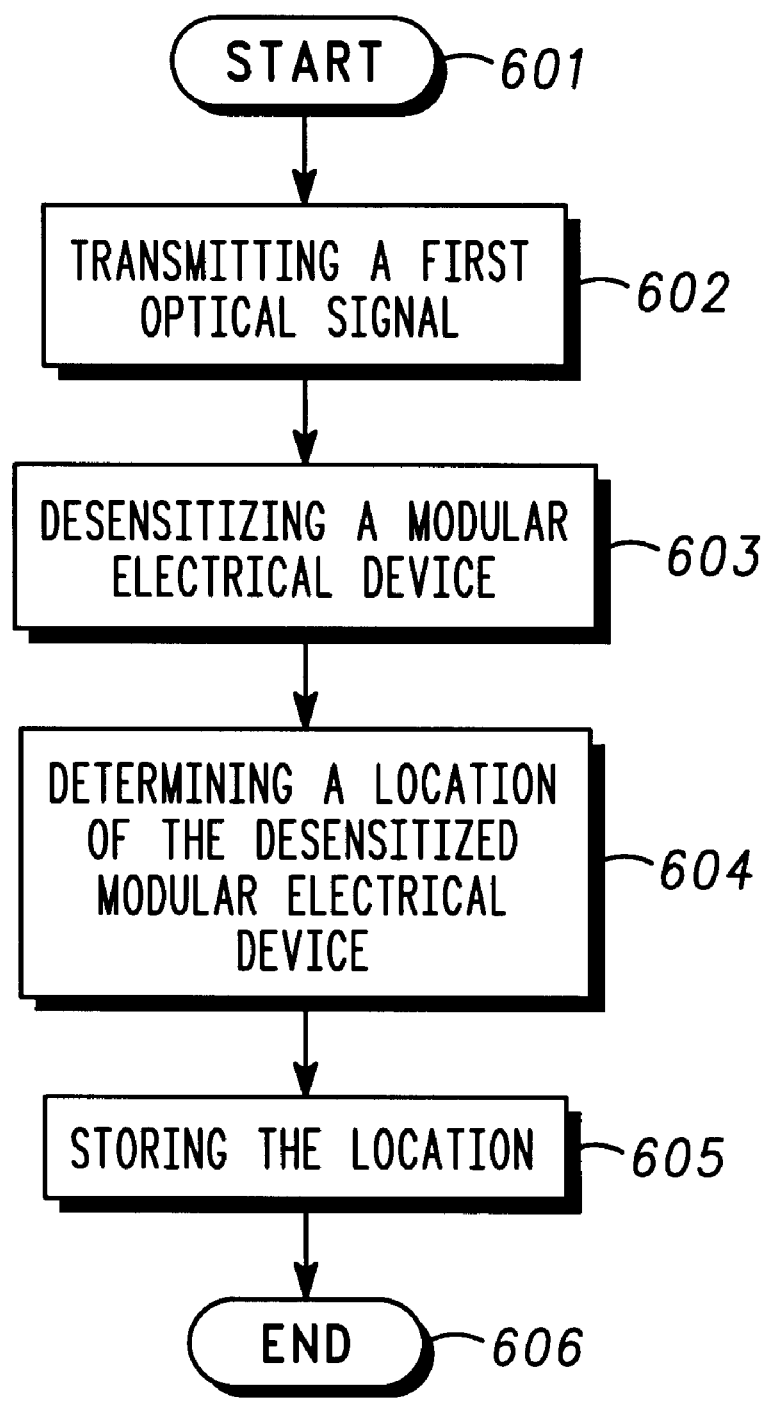
FIG. 6 is a logic flow diagram of steps executed by a communication system to determine the location of a communication device in accordance with a preferred embodiment of the present invention.

FIG. 6 illustrates a logic flow diagram 600 of steps executed to determine a location of a modular electrical device in accordance with a preferred embodiment of the present invention. In the preferred embodiment as described in FIG. 6, the logic flow begins (601) when a communication system comprising multiple modular electrical devices, preferably multiple base station modules, and an optical signal source, all coupled to an optical communication resource, transmits (602) a first optical signal via the optical communication resource. Preferably, the first optical signal is transmitted by a first modular electrical device, preferably a controller module, of the multiple modular electrical devices. The communication system also optically desensitizes (603) a second modular electrical device, preferably an RF module, of the multiple modular electrical devices. In the preferred embodiment, the controller module comprises an optical signal receiver, an optical signal transmitter, and a memory, all coupled to a processor, and the RF module comprises an optical signal receiver and an optical signal transmitter coupled to a processor. Positioned opposite the second transceiver module, along the optical communication resource, is the optical signal source (e.g., a light-emitting diode). When the optical signal source is activated, preferably in response to a control signal (e.g., a voltage) conveyed to the optical signal source by the controller module, the optical signal source illuminates the optical signal receiver of the RF module and desensitizes the RF module with respect to the receipt of other optical signals.

The communication system, preferably the processor of the controller module, then determines (604) a location (e.g., a slot in a multi-slot transceiver chassis) of the optically desensitized RF module. In the preferred embodiment, the RF module transmits a second optical signal in response to receiving the first optical signal. After the first optical signal has been transmitted, the controller module detects for the presence of the second optical signal on the optical communication resource. When the controller module fails to detect the second optical signal, the controller module determines that the RF module has been desensitized by the at least one optical signal source and, as a result, has failed to receive the first optical signal. Preferably, a database comprising a location of the optical signal source is stored in the memory of the controller module. The controller module determines the location of the optical signal source by reference to the database, and determines the location of the optically desensitized RF module based on the determined location of the optical signal source.

In the preferred embodiment, the controller module and the RF module are each located in a separate slot in a multi-slot transceiver chassis. Traversing the chassis is an optical communication resource. The optical signal source is located opposite the slot containing the RF module and along the optical communication resource. In the database comprising a location of the optical signal source, the location of the optical signal source is referenced to the opposite slot. When the RF module is desensitized by the optical signal source, the controller module is able to determine the slot in which the second transceiver module is located by reference to the database. The communication system, preferably the controller module, then stores (605) the location of the optically desensitized RF module, and the logic flow ends (606).

The present invention as described above provides a method whereby a first modular electrical device, preferably a controller module, can locate a second modular electrical device, preferably an RF module, in an optical communication system without the intervention of a technician. By determining the location of the RF module, the controller module can then determine the proper configuration of the RF module or can subsequently direct appropriate communications to the RF module. For example, if the controller module is programmed with information concerning the frequency of an antenna coupled to a slot, the invention permits the controller module to determine that an RF module, for example an RF transmitter module, has been inserted into the slot, so that the controller module may then configure the RF module in accordance with the frequency of the connected antenna. As another example, the invention permits a controller module to determine that a particular RF module is connected to an antenna for a particular sector, so that the controller module may direct transmissions for the particular sector to the particular RF module.

FIG. 7 illustrates a logic flow diagram 700 of steps executed by a communication system comprising multiple modular electrical devices, preferably multiple base station modules, and an optical signal source, all coupled to an optical communication resource, for selective optical communication among multiple modular electrical devices in accordance with a preferred embodiment of the present invention. In the preferred embodiment as described in FIG. 7, the logic flow begins (701) when the communication system identifies (702) a first modular electrical device, preferably an RF module, of the multiple modular electrical devices, that is not a desired recipient of an optical signal to be transmitted. Alternatively, the communication system might fail to identify the RF module as a desired recipient of an optical signal. The communication system also identifies (703) the optical signal source, wherein the optical signal source is positioned opposite the RF module along the optical communication resource.

In the preferred embodiment, the RF module comprises an optical signal receiver and an optical signal transmitter coupled to a processor. Preferably, the communication system further comprises a controller module, wherein the controller module comprises an optical signal receiver, an optical signal transmitter, and a memory coupled to a processor. The memory of the controller module comprises a database of the multiple base station modules and a location of the optical signal source (e.g., a slot or a base station module positioned in a slot in a base station card cage opposite the optical signal source). When the communication system identifies the RF module, the communication system is also able to identify the optical signal source by reference to the database.

The communication system, preferably the controller module, activates (704) the optical signal source (e.g., a light-emitting diode), preferably by transmitting a control signal (e.g., a voltage) to the optical signal source. The activation of the optical signal source optically desensitizes (705) the optical signal receiver of the RF module.

The communication system, preferably the controller module, transmits (706) an optical signal on the optical communication resource (e.g., an optical signal conductor such as a plastic tube). A second modular electrical device of the multiple modular electrical devices receives (707) the transmitted optical signal, while the RF module fails to receive (708) the transmitted optical signal because the optical signal receiver of the RF module has been desensitized by the optical signal source, and the logic flow ends (709). Thus, the controller module is able to selectively communicate with the first and second modular electrical devices.

The present invention as described above provides a method whereby a communication system can selectively communicate among multiple modular electrical devices via optical signals and an optical communication resource. By activating the optical signal source opposite an optical signal receiver of a modular electrical device, and thereby inactivating the optical signal receiver of the modular electrical device, the communication system can selectively query and distribute information to the modular electrical device. The invention eliminates the need for a technician to program configuration information into a controller module and provides a method whereby the controller module can selectively communicate with and configure other modular electrical devices.

In general, the present invention provides a method and an apparatus whereby an increased number of RF modules can be contained in a smaller volume at reduced levels of RF electromagnetic interference, while also facilitating automated configuration and inter-module communication by a controller module. The controller module communicates with modular electrical devices via optical signals and an optical communication resource. Since optical signals do not radiate RF electromagnetic interference, the use of optical signals traveling along an optical communication resource eliminates the problem of RF electromagnetic interference coupling onto other, parallel communication resources or radiating RF electromagnetic interference to other base station or other external electrical devices in the same rack or at the same base site. Furthermore, by desensitizing the optical signal receiver of each modular electrical device, the present invention provides for optically locating modular electrical devices in a communication system and for selectively communicating among the modular electrical devices.

While the present invention has been particularly shown and described with reference to particular embodiments thereof, it will be understood by those skilled in the art that various changes in form and details may be made therein without departing from the spirit and scope of the present invention.

We claim:

1. An apparatus for interconnecting a plurality of modular electrical devices in a communication system, the apparatus comprising:
   a first modular electrical device of the plurality of modular electrical devices, wherein the first modular electrical device comprises an optical signal transmitter that transmits a first optical signal;
   a second modular electrical device of the plurality of modular electrical devices, wherein the second modular electrical device comprises an optical signal receiver that is capable of receiving the first optical signal;
   an optical signal source that transmits a second optical signal, wherein the second optical signal blocks reception of the first optical signal in the optical signal receiver of the second modular electrical device; and
   an optical communication resource coupled to the first modular electrical device, the second modular electrical device, and the optical signal source.

2. The apparatus of claim 1, wherein the first modular electrical device further comprises a processor coupled to a second optical signal receiver and the optical signal transmitter.

3. The apparatus of claim 2, wherein the optical signal source is coupled to the first modular electrical device, wherein the first modular electrical device generates a control signal, and wherein the optical signal source transmits the second optical signal in response to the control signal.

4. The apparatus of claim 2, wherein the second modular electrical device further comprises a second processor coupled to the optical signal receiver and a second optical signal transmitter, wherein the second modular electrical device transmits a third optical signal in response to receiving the first optical signal, and wherein the first modular electrical device detects for the third optical signal in response to the transmission, by the first modular electrical device, of the first optical signal and the control signal.

5. The apparatus of claim 4, wherein the first modular electrical device determines whether the second modular electrical device has received the first optical signal based on the detection, by the first modular electrical device, of the third optical signal.

6. The apparatus of claim 5, wherein the first modular electrical device further comprises a memory coupled to the processor of the first modular electrical device, and wherein the memory comprises a database comprising a location of the optical signal source.

7. The apparatus of claim 6, wherein the first modular electrical device determines a location of the second modular electrical device based on the determination, by the first modular electrical device, whether the second modular electrical device has received the first optical signal.

8. The apparatus of claim 7, wherein the first modular electrical device selectively communicates with the second modular electrical device by transmitting a data packet along the optical communication resource and addressing the data packet to the second modular electrical device by use of an identifier in the header of the data packet that is unique to the second modular electrical device.

9. The apparatus of claim 1, wherein the optical communication resource comprises a optical signal conductor.

10. The apparatus of claim 1, wherein the at least one optical signal source is embedded in the optical communication resource.

11. The apparatus of claim 1, wherein the optical signal source is positioned opposite the second modular electrical device along the optical communication resource.

12. A method executed by a communication system comprising a plurality of modular electrical devices, an optical signal source, and an optical communication resource, for selectively addressing a communication among the plurality of modular electrical devices, wherein the communication comprises a transmitted optical signal, the method comprising the steps of:
   identifying a first modular electrical device of the plurality of modular electrical devices, wherein the first modular electrical device is not a desired recipient of a transmitted optical signal;
   identifying the optical signal source, wherein the optical signal source is positioned opposite the first modular electrical device along the optical communication resource:
   activating the optical signal source;
   optically blocking reception by the first modular electrical device in response to the activation of the optical signal source;
   transmitting the optical signal on the optical communication resource;
   receiving, by a second modular electrical device of the plurality of modular electrical devices, the transmitted optical signal; and
   failing to receive, by the first modular electrical device, the transmitted optical signal.

13. The method of claim 12, wherein the step of activating the optical signal source comprises the steps of:
   transmitting a control signal; and
   activating the optical signal source in response to the control signal.

14. The method of claim 12, wherein the step of identifying the optical signal source comprises referring to a database comprising a location of the optical signal source.

15. A method comprising:
   transmitting, by an optical signal transmitter of a first modular electrical device, a first optical signal;
   transmitting, by an optical signal source, a second optical signal; and
   receiving, by an optical signal receiver of a second modular electrical device, the second optical signal, wherein the second optical signal blocks reception of the first optical signal in the optical signal receiver of the second modular electrical device.

16. The method of claim 15 further comprising the steps of:
   transmitting a third optical signal;
   determining a failure of the second modular electrical device to receive the third optical signal;
   determining a location of the optical signal source by reference to a database comprising a location of the optical signal source; and
   determining the location of the second modular electrical device based on the determination of the location of the optical signal source.

17. The method of claim 16, wherein the step of determining a failure of the second modular electrical device comprises the steps of:
   detecting for the presence of a fourth optical signal in response to receiving the third optical signal; and
   when the fourth optical signal is not detected, determining the failure of the second modular electrical device to receive the third optical signal.

* * * * *